Patented Jan. 28, 1936

2,028,776

UNITED STATES PATENT OFFICE 2,028,776

CELLULOSIC ARTICLES AND METHOD OF PREPARING THE SAME

Harold Hibbert, Montreal, Quebec, Canada, assignor to Celanese Corporation of America, a corporation of Delaware No Drawing. Application April 23, 1932,
Serial No. 607,229

10 Claims. (Cl. 91—70)

This invention relates to the preparation of foils, films and other articles made of cellulose or its derivatives, and relates more particularly to rendering the same more impervious to moisture.

An object of my invention is to render articles and particularly sheet-like articles made of cellulosic material more impermeable by condensing thereon a liquid capable of polymerization to form solid or semi-solid resinous material and then subjecting the same to polymerization, whereby a layer of resinous material is formed on the surfaces of said articles to render the same more impervious or waterproof. A further object of my invention is to employ a volatile vinyl compound as the polymerizable liquid in such process. Other objects of this invention will appear from the following detailed description.

Articles made of, or containing on the surface thereof, cellulose, regenerated cellulose or cellulose derivatives are not as impervious to water, either in liquid or vapor state, as is often desired. For instance, it has been found that thin foils made of regenerated cellulose or cellulose acetate plastics to be used in the wrapping of tobacco products or foodstuffs are more or less permeable so that moisture in the form of vapors may pass through the same, whereby the original humidity of the wrapped articles in time becomes altered.

I have found that if such articles are subjected to the vapors of volatile liquids capable of becoming polymerized to a solid or semi-solid consistency under such conditions as to cause at least part of the vapors to become condensed or absorbed on the surfaces of such articles, and the same are then subjected to a process causing polymerization, the resulting layer of polymerized compound renders the articles more impervious to moisture, air or other gases. The condensing or absorbing of the vapors is of great advantage over the application of the material as a liquid, since much more uniform thin layers may be deposited in this manner, and the use of a diluent or solvent to make the necessary dilute solution of the liquid, if it is to be applied as a liquid, is avoided.

In accordance with my invention I render articles made of, or containing cellulosic materials at least on the surface thereof, more impervious or waterproof by subjecting the same to the vapors of a liquid capable of polymerization under such conditions that part of the same becomes condensed or is absorbed on the surface of the article and then subjecting the same to polymerization, whereby a layer of relatively impervious polymerization product is formed.

Articles to be treated in accordance with this invention may be of any suitable form. This invention is particularly applicable to the treatment of foils or transparent paper having a thickness of the order of 0.001" to 0.003" to be used for wrapping articles or for any other suitable purpose. The articles to be treated by this invention on the other hand may be in the form of films to be used for photographic, cinematographic or other purposes, or other sheet-like materials, which may be made by casting or flawing a solution of the cellulose or cellulose derivative on to smooth metallic or glass surfaces, such as film wheels, drums, bands, tables, etc. as is well known in the art.

Other articles such as yarns, fabrics or articles made of plastic compositions containing derivatives of cellulose may be treated by this invention. In its broad aspects this invention includes the treatment of paper, cardboard, cotton fabrics and other articles made of cellulose fibres.

The articles to be treated by this invention may be made of or contain on at least the surface thereof any suitable cellulosic material, such as cellulose itself, regenerated cellulose, or derivatives of cellulose. The derivatives of cellulose include besides nitrocellulose, organic derivatives of cellulose such as organic esters of cellulose and cellulose ethers. Examples of organic esters of cellulose are cellulose acetate, cellulose formate, cellulose butyrate and cellulose propionate while examples of cellulose ethers are ethyl cellulose, methyl cellulose and benzyl cellulose. Generally if the articles are made of cellulose derivatives, there will be present plasticizers such as triacetin, diethyl phthalate, dibutyl phthalate, diethyl tartrate, dibutyl tartrate and any other desired materials such as pigments and effect materials, as is well known in the cellulose derivative plastic art.

This invention is of general application to the treatment of the articles with the vapors of a polymerizable liquid. Such liquid may be a substantially unpolymerized vinyl compound, such as the unpolymerized divinyl ether, vinyl acetate, styrene, which is the vinyl benzene, vinyl ethyl ether, vinyl ethyl carbonol, etc. Polymerizable liquids other than vinyl compounds may be used, examples of which are glycide or glycidol $C_2H_3O.CH_2.OH$, or other glycides, which polymerize at elevated temperatures in the presence of catalysts such as alkalies or zinc chloride.

Conveniently in order to deposit the vinyl compound onto the surface to be treated, the surface is exposed to the vapors of the vinyl compound. In the case when the foil or surface of the article to be treated is made of derivatives of cellulose, some of the vinyl compounds are mutually soluble with the derivative of cellulose and therefore are absorbed on the surface of the same. In order to promote the condensation of the vinyl compound on to the surfaces of the article to be treated, such surfaces are preferably kept at a low temperature.

The polymerization of the polymerizable compound after it has been applied to the surface may be conducted in any suitable manner. Thus in the case of vinyl compounds, the polymerization may be accomplished by heating to temperatures of 70 to 100° C. or more, by exposure to light rays, particularly sunlight or light rich in ultra-violet rays, such as emitted from a mercury vapor lamp. If desired, catalysts such as benzoyl peroxide or other organic peroxides, uranium salts and the like, promoting the polymerization of the vinyl compound may be employed, and small quantities of these catalysts may be incorporated in or coated on the cellulosic films, foils or other articles, either during their manufacture or after their formation.

If desired, a thin layer of paraffin wax, ceresin wax, beeswax or other wax may be incorporated in or applied to the surface of the foils or other articles, either before or after application and polymerization of the vinyl compound. If the foil is made of regenerated cellulose, a thin solution containing the wax, nitrocellulose and a plasticizer such as triphenyl phosphate, dissolved in a suitable solvent may be applied to the foil to coat the same with very thin coatings of these materials, in order to increase their impermeability either before or after the application and polymerization of the vinyl compound.

Thin foils, films, sheets or other articles made of or treated in accordance with this invention have greatly increased impermeability to moisture or other liquids. Thin foils prepared in accordance with this invention are eminently suitable for the wrapping of cigars, cigarettes or other tobacco articles and confectionary, cakes and other foodstuffs.

By way of an example of a method of carrying out my invention the following is given. Thin foils of a thickness of 0.001" to 0.003" made of a plastic composition containing cellulose acetate and plasticizer, is passed around a drum within a closed chamber. Cold brine is circulated within the drum to maintain its temperature below 10°, say 0° C. Vapors of divinyl ether, $(CH_2:CH)_2O$, are passed into the chamber and a portion of the vinyl ether is condensed on or absorbed in the surface of the cool foil. If it is so desired to cause the divinyl ether to be deposited on both sides of the foil, two cooled drums may be provided either in one chamber or in separate chambers, the drums being so arranged that on one of the drums, one side of the foil is exposed to the vapors, while the other side of the foil is exposed to the vapors while on the other drum.

The foil with the vinyl ether condensed on the surface thereof is then passed into another chamber to cause the polymerization thereof. This chamber may be heated to 80 to 100° C. to cause polymerization of the vinyl compound, or the chamber may be flooded with ultra-violet light and be maintained at ordinary temperatures or elevated temperatures up to 100° C. In this manner, the divinyl ether polymerizes to produce a rubber-like, water-resistant surface, thus imparting greatly increased impermeability and waterproofness to the foil.

It is to be understood that the foregoing detailed description is given merely by way of illustration and that many variations may be made therein, without departing from the spirit of my invention.

Having described my invention, what I claim and desire to secure by Letters Patent is:

1. Method of rendering surfaces of non-metallic articles more impermeable, which comprises exposing surfaces of articles to vapors of a volatile polymerizable material selected from the group consisting of substantially unpolymerized vinyl compounds and glycides to deposit the polymerizable material on said surfaces, and then polymerizing said polymerizable material to form a surface coating.

2. Method of rendering surfaces of cellulosic material more impermeable, which comprises exposing surfaces of cellulosic material to vapors of a volatile polymerizable material selected from the group consisting of substantially unpolymerized vinyl compounds and glycides, to deposit the polymerizable material on said surfaces, and then polymerizing said polymerizable material to form a surface coating.

3. Method of rendering surfaces of derivative of cellulose material more impermeable, which comprises exposing surfaces of derivatives of cellulose to vapors of a volatile polymerizable material selected from the group consisting of substantially unpolymerized vinyl compounds and glycides, to deposit the polymerizable material on said surfaces, and then polymerizing said polymerizable material to form a surface coating.

4. Method of rendering surfaces of cellulose acetate material more impermeable, which comprises exposing surfaces of cellulose acetate to vapors of a volatile polymerizable material selected from the group consisting of substantially unpolymerized vinyl compounds and glycides, to deposit the polymerizable material on said surfaces, and then polymerizing said polymerizable material to form a surface coating.

5. Method of imparting greater impermeability to foils or films containing cellulosic material, which comprises exposing the same at low temperatures to the vapors of a volatile polymerizable material selected from the group consisting of substantially unpolymerized vinyl compounds and glycides, whereby the polymerizable material is deposited on the surface of said foils or films, and then polymerizing said polymerizable material to form a coating on the surface of said foils or films.

6. Method of imparting greater impermeability to foils or films containing cellulose acetate, which comprises exposing the same at low temperatures to the vapors of a volatile polymerizable material selected from the group consisting of substantially unpolymerized vinyl compounds and glycides, whereby the polymerizable material is deposited on the surface of said foils or films, and then polymerizing said polymerizable material to form a coating on the surface of said foils or films.

7. Method of imparting greater impermeability to foils or films containing cellulosic material comprising exposing the same to the vapors of a substantially unpolymerized vinyl compound to deposit a layer of the vinyl compound on at least one surface of the foil or film and then polymerizing the vinyl compound to form a solid to semi-solid resin material.

8. Method of imparting greater impermeability to foils or films containing cellulose acetate comprising exposing the same to the vapors of a substantially unpolymerized vinyl compound to deposit a layer of the vinyl compound on at least one surface of the foil or film and then polymerizing the vinyl compound to form a solid to semi-solid resin material.

9. Method of imparting greater impermeability to foils or films containing cellulosic material comprising exposing the same to the vapors of a substantially unpolymerized divinyl ether compound to deposit a layer of the divinyl ether compound on at least one surface of the foil or film and then polymerizing the divinyl ether compound to form a solid to semi-solid resin material.

10. Method of imparting greater impermeability to foils or films containing cellulose acetate comprising exposing the same to the vapors of a substantially unpolymerized divinyl ether compound to deposit a layer of the divinyl ether compound on at least one surface of the film or foil and then polymerizing the divinyl ether to form a solid to semi-solid resin material.

HAROLD HIBBERT.